Oct. 1, 1963
R. B. RALLS
3,105,718
SUN VISOR ATTACHMENT HAVING PLURAL ADJUSTABLE
ANTI-GLARE SCREENS
Filed March 21, 1961
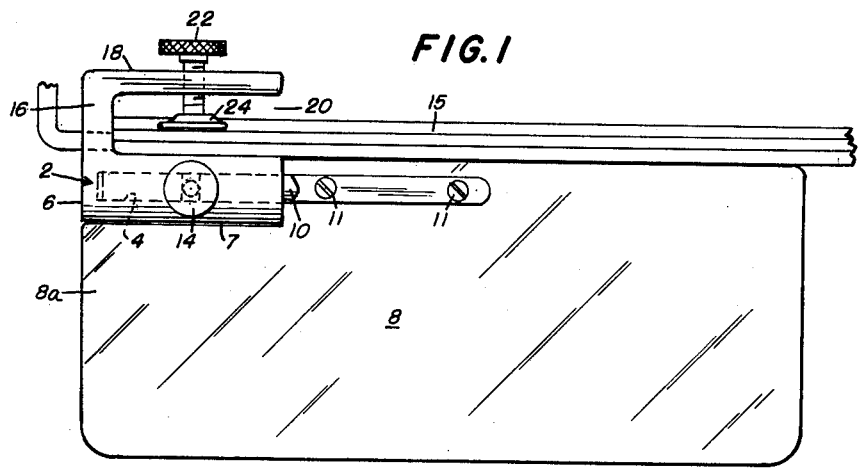
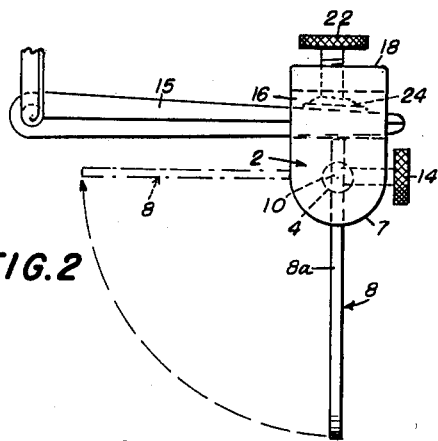
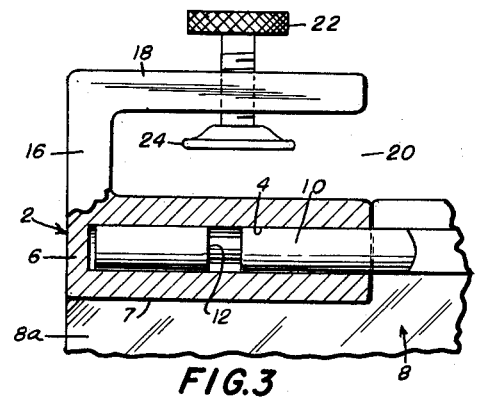
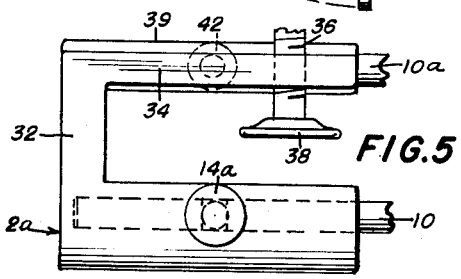
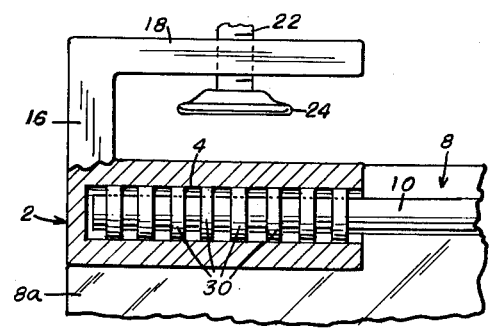
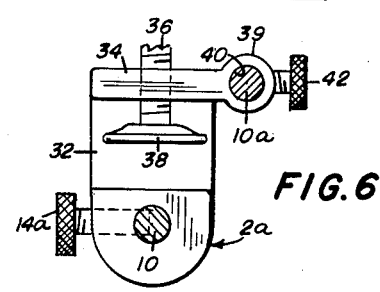
INVENTOR
ROBERT BLOUNT RALLS
deceased
by ELEANOR S. RALLS, Executrix
BY Fisher, Christen & Goodson,
ATTORNEYS 3,105,718
SUN VISOR ATTACHMENT HAVING PLURAL
ADJUSTABLE ANTI-GLARE SCREENS
Robert B. Ralls, deceased, late of Charlottesville, Va., by
Eleanor S. Ralls, executrix, 1855 Winston Road,
Charlottesville, Va.
Filed Mar. 21, 1961, Ser. No. 97,395
1 Claim. (Cl. 296—97)

This invention is an improved anti-glare screen for motor vehicles, for use in softening and lessening the glare of the headlights of approaching cars, and for softening the glare of bright sunlight.

The objects of the invention are to provide an anti-glare screen, which may be readily positioned in the car, as by clamping it to the usual sun visor, at the desired level and at the desired angle, for most efficient operation. When not in use, the screen may be turned upwardly, to an inoperative position.

More specifically, the invention comprises a hub member of substantial horizontal length having a horizontal recess therein, open at one end. The anti-glare screen is provided at one side with an axle member, of substantial horizontal extent, which fits into the recess in the hub member. The axle fits into the recess and is adjustable therein, by pivoting about its longitudinal axis, to position the screen at the desired angle for most efficient operation. The axle is preferably provided with an annular recess therearound; the hub is provided with a set screw engaging in said recess and serving to frictionally clamp the axle in the desired angular position.

The screen may be made of any desired translucent or transparent material, including the known synthetic plastics, having the desired optical properties.

The hub member is provided at one end with a supporting bracket providing a recess for receiving one edge of the usual sun visor of the car, this bracket being provided with a screw clamp for securing the screen in place on the sun visor at any desired eye level.

Supporting means for a spare screen of different optical properties is also provided.

The invention will now be described in connection with the accompanying drawings, wherein:

FIG. 1 is a front elevational view showing the device installed on a sun visor;

FIG. 2 is a side elevation of FIG. 1;

FIG. 3 is an enlarged fragmentary view of the device partly in section;

FIG. 4 is a view similar to FIG. 3 of a modified device;

FIG. 5 is a front elevational view of a modified device;

FIG. 6 is a side elevation of FIG. 5.

Referring now to these drawings, the invention comprises a hub member 2, provided with a longitudinal recess 4 and preferably closed at one end, as at 6. Its lower edge is circumferentially rounded, as at 7.

The anti-glare screen 8, made of any desired tinted glass or plastic, is provided with an axle member 10, secured to the screen as by fasteners 11. The axle member could, if desired, be molded integrally with the screen.

The axle 10 is provided with a circumferential groove 12. In order to frictionally clamp the axle in any desired angular position about its axis, one side of hub 2 is provided with a set screw 14 positioned to pass into recess 4 and to engage in annular recess 12 against axle 10.

When the set screw is loosened, the axle is turned about its axis to the desired angular position, and the screw is tightened to hold it in such adjusted position.

The screen 8 is extended laterally below hub 2, as at 8a, the upper edge of 8a fitting snugly against the circumferential rounded portion 7 of the hub, so that there is no light leakage in any angular position of the screen. This extension 8a is important as providing additional protection directly in front of the eyes of the driver.

In order to mount the screen on a sun visor 15, a bracket is carried by one end of hub 2, this bracket comprising a vertical member 16 and a horizontal plate 18, to define a slot 20 for engaging over one edge of the usual visor. A set screw 22 passes thru plate 18 and is provided with a swiveled washer 24 for bearing against the visor. With this arrangement, the screen may be positioned at various levels on the visor, to accommodate the eye level of the driver so that it is readily useable by tall as well as short drivers.

Instead of the set screw 14 for holding the axle in place, the axle may be provided with a plurality of filler washers or bushings 30 as in FIG. 4 large enough to fit fairly tightly in the hub member, yet permitting the turning of the axle against the friction of said washers to position the screen in any desired angular position, where it is held by friction of the washers. These bushings 30 may be made of rubber, or a suitable plastic such as nylon, for example.

Under some driving conditions, glare screens of different optical properties may be desirable, as light and dark, or amber and green, for example. The modification shown in FIG. 5, provides for carrying a second or spare screen. In this form, a recessed hub 2a provided with set screw 14a is utilized as before. The supporting bracket comprises an end plate 32, supporting a top plate 34, provided with a clamping screw 36 and swiveled washer 38, for clamping against the sun visor. Plate 34 is provided with a small hub member 39 having a recess 40 for receiving an axle, such as 10a, for a spare screen of different optical properties, to be clamped in place by a set screw 42 passing through hub 39, to bear against axle 10a. When desired, the spare screen in hub 39 may be interchanged with the screen in hub 2a.

To summarize, the anti-glare screen may be readily clamped in the desired position on a sun visor by set screw 22, and the glare screen may be positioned at any desired angle for most efficient operation, by turning it about the axle 10. The screen may be positioned at the desired eye level by use of set screws 22 or 36. When not in use, the screen may be turned about 90° more or less, to the inoperative position. A second or spare screen held in place by set screw 42 may be interchanged with the first screen, if desired.

While the preferred construction and embodiments of the invention have been described in some detail, it should be understood that it may be carried out in other ways, as falling within the scope of the following claim:

I claim as my invention.

An anti-glare screen attachment for motor vehicles, comprising a horizontal hub member of substantial length, provided with a longitudinal recess therein, an axle member pivotally mounted in the recess in the hub member, said axle member being provided with an annular recess, a set screw threadably mounted in said hub member and projecting into said annular recess of the axle member for clamping it in a desired angular position, an anti-glare screen carried by said axle member, said hub member being provided with a transverse vertical arm at one end, said arm at its outer end carrying an upper horizontal plate substantially perpendicular thereto, and parallel to the axis of said longitudinal recess, said arm and plate defining a visor-receiving space, said upper plate being provided with a second small hub member, a set screw threadably mounted in said second hub member for clamping against an axle member of another anti-glare screen, and threaded clamping means carried by said plate for clamping to the sun visor of a motor vehicle.

References Cited in the file of this patent

UNITED STATES PATENTS

| | | |
|---|---|---|
| 1,599,183 | Phillips | Sept. 7, 1926 |
| 1,926,979 | Gifford | Sept. 12, 1933 |
| 2,207,668 | Hudgings | July 9, 1940 |
| 2,261,881 | Horstmann | Nov. 4, 1941 |
| 2,492,074 | Thompson | Dec. 20, 1949 |
| 2,965,416 | Dryden | Dec. 20, 1960 |

FOREIGN PATENTS

| | | |
|---|---|---|
| 269,165 | Great Britain | July 21, 1927 |
| 1,101,076 | France | Apr. 13, 1955 |